United States Patent
Wright et al.

(10) Patent No.: US 11,727,338 B2
(45) Date of Patent: Aug. 15, 2023

(54) CONTROLLING SUBMISSION OF CONTENT

(71) Applicant: Nokia Technologies Oy, Espoo (FI)

(72) Inventors: Christopher Wright, London (GB); David Duffy, Cambridge (GB); Matthew Lawrenson, Chesterfield, MO (US)

(73) Assignee: NOKIA TECHNOLOGIES OY, Espoo (FI)

( * ) Notice: Subject to any disclaimer, the term of this patent is extended or adjusted under 35 U.S.C. 154(b) by 106 days.

(21) Appl. No.: 16/991,753

(22) Filed: Aug. 12, 2020

(65) Prior Publication Data
US 2021/0056489 A1 Feb. 25, 2021

(30) Foreign Application Priority Data

Aug. 23, 2019 (EP) .................................... 19193231

(51) Int. Cl.
| | | |
|---|---|---|
| *G06Q 10/00* | (2023.01) | |
| *G06Q 10/0639* | (2023.01) | |
| *G06N 20/00* | (2019.01) | |
| *G06Q 10/10* | (2023.01) | |
| *G06Q 50/00* | (2012.01) | |

(52) U.S. Cl.
CPC ....... *G06Q 10/06398* (2013.01); *G06N 20/00* (2019.01); *G06Q 10/10* (2013.01); *G06Q 50/01* (2013.01)

(58) Field of Classification Search
CPC .. G06Q 10/10; G06Q 10/063; G06Q 10/0639; G06Q 10/06398; G06N 20/00
See application file for complete search history.

(56) References Cited

U.S. PATENT DOCUMENTS

| | | | |
|---|---|---|---|
| 2010/0250501 A1* | 9/2010 | Mandagere | G06F 16/285 711/216 |
| 2010/0325135 A1* | 12/2010 | Chen | G06F 16/4387 707/769 |
| 2015/0185995 A1 | 7/2015 | Shoemaker et al. | |
| 2015/0310344 A1 | 10/2015 | Gunjan | |

(Continued)

OTHER PUBLICATIONS

Mangaonkar, A. (2017). Collaborative detection of cyberbullying behavior in twitter data (Order No. 10607423). Available from ProQuest Dissertations and Theses Professional. (1980717721). (Year: 2017).*

(Continued)

*Primary Examiner* — William S Brockington, III
(74) *Attorney, Agent, or Firm* — Alston & Bird LLP

(57) ABSTRACT

An apparatus comprising means for: obtaining a value of one or more parameters which vary with actions of a user; accessing an artificial intelligent agent configured to use one or more trained machine learning models selected, from a plurality of differently trained machine learning models, based on the obtained value of one or more parameters, the plurality of differently trained machine learning models being configured to provide respective outputs; providing content composed by the user as an input to the artificial intelligent agent to cause generation of feedback to the user on the content composed by the user, the feedback being dependent on the artificial intelligent agent; controlling a submission based on the content composed by the user; and causing the feedback to be provided to the user.

20 Claims, 7 Drawing Sheets

(56) References Cited

U.S. PATENT DOCUMENTS

Figure 1:
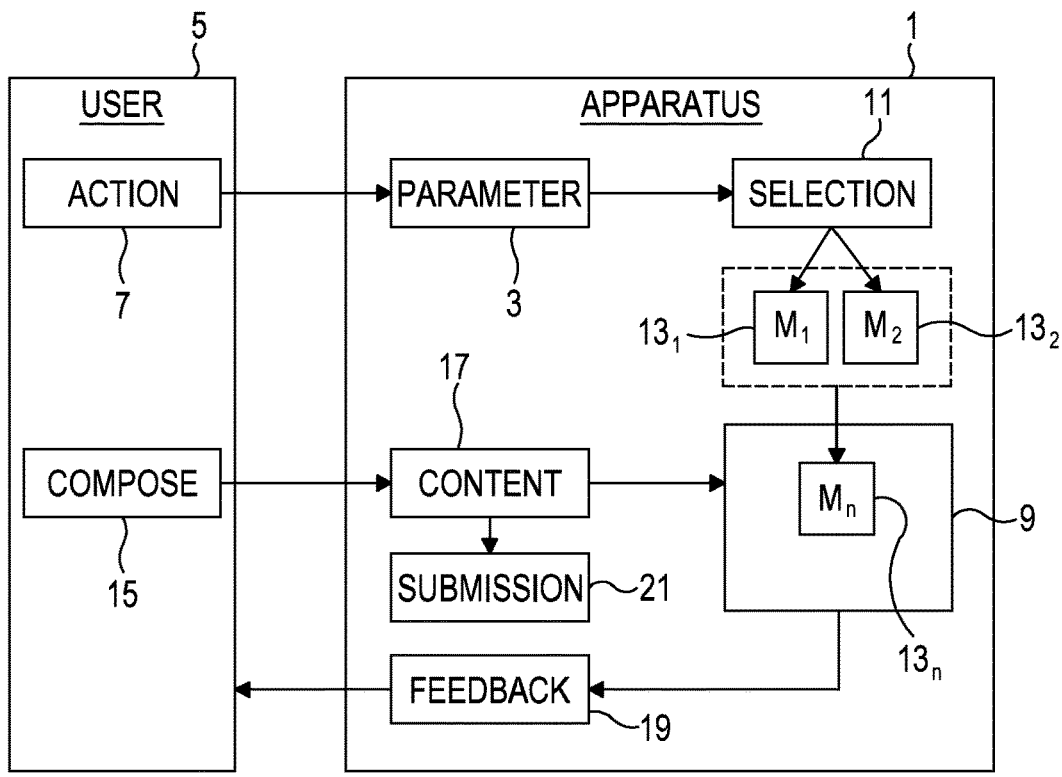

| | | | | |
|---|---|---|---|---|
| 2015/0347905 | A1* | 12/2015 | Chen | G06Q 50/01 |
| | | | | 706/12 |
| 2017/0185581 | A1 | 6/2017 | Bojja et al. | |
| 2017/0250931 | A1* | 8/2017 | Ioannou | H04L 67/18 |
| 2017/0322923 | A1 | 11/2017 | Dixon et al. | |
| 2018/0061400 | A1* | 3/2018 | Carbune | G06F 16/3331 |
| 2018/0260727 | A1* | 9/2018 | Blanco | G06N 7/005 |

OTHER PUBLICATIONS

"Can AI Understand Your Emotions?", Good Audience, Retrieved on Aug. 12, 2020, Webpage available at : https://blog.goodaudience.com/can-ai-understand-your-emotions-88d3a561dbc4.

"Tone Analyzer", IBM, Retrieved on Aug. 12, 2020, Webpage available at : https://www.ibm.com/watson/services/tone-analyzer/.

"Microsoft Predicts Everyone will Soon Have an AI "Second Self" to Boost Intelligence", Big Think, Retrieved on Aug. 12, 2020, Webpage available at : https://bigthink.com/paul-ratner/microsoft-predicts-everyone-will-soon-have-an-ai-second-self-to-boost-intelligence.

"Neuroscience Research Shows How Mood Impacts Perception", Psychology Today, Retrieved on Aug. 12, 2020, Webpage available at : https://www.psychologytoday.com/us/blog/fulfillment-any-age/201611/neuroscience-research-shows-how-mood-impacts-perception.

"Twitter-vention: What Behavioral Science Says About Impulse Tweeting", Center for Advanced Hindsight, Retrieved on Aug. 12, 2020, Webpage available at : https://advanced-hindsight.com/blog/twitter-vention-what-behavioral-science-says-about-impulse-tweeting/.

"Our Online Personalities Change Across Different Social Media Platforms", How Stuff Works, Retrieved on Aug. 12, 2020, Webpage available at : https://computer.howstuffworks.com/internet/social-networking/networks/online-personality-change-social-media.htm.

"Multiple Personalities And Social Media: The Many Faces of Me", Forbes, Retrieved on Aug. 12, 2020, Webpage available at : https://www.forbes.com/sites/meghancasserly/2011/01/26/multiple-personalities-and-social-media-the-many-faces-of-me/#727ecaae6d51.

"Natural Language API Basics", Google Cloud, Retrieved on Aug. 12, 2020, Webpage available at : https://cloud.google.com/natural-language/docs/basics.

"DeepBreath: Preventing Angry Emails with Machine Learning", Google Cloud, Retrieved on Aug. 12, 2020, Webpage available at : https://cloud.google.com/blog/products/gcp/deepbreath-preventing-angry-emails-with-machine-learning.

Kusner et al., "GANS for Sequences of Discrete Elements with the Gumbel-softmax Distribution", arXiv, Nov. 12, 2016, pp. 1-6.

Yu et al., "SeqGAN: Sequence Generative Adversarial Nets with Policy Gradient", arXiv, Aug. 25, 2017, 11 pages.

Donahue et al., "Adversarial Text Generation Without Reinforcement Learning", arXiv, Oct. 11, 2018, 6 pages.

Extended European Search Report received for corresponding European Patent Application No. 19193231.8, dated Feb. 25, 2020, 8 pages.

Braunstein et al., "Indirect Content Privacy Surveys: Measuring Privacy Without Asking About It", Symposium on Usable Privacy and Security (SOUPS), Jul. 20-22, 2011, pp. 1-14.

* cited by examiner

CONTROLLING SUBMISSION OF CONTENT

TECHNOLOGICAL FIELD

Embodiments of the present disclosure relate to controlling submission of content. Some relate to controlling submission of content composed by a user and providing feedback on the content.

BACKGROUND

Content composed by a user can be provided as an input to natural language processing to determine a sentiment of the content composed by the user. The user can be warned of a negative sentiment in the composed content.

BRIEF SUMMARY

According to various, but not necessarily all, embodiments there is provided an apparatus comprising means for: obtaining a value of one or more parameters which vary with actions of a user; accessing an artificial intelligent agent configured to use one or more trained machine learning models selected, from a plurality of differently trained machine learning models, based on the obtained value of one or more parameters, the plurality of differently trained machine learning models being configured to provide respective outputs; providing content composed by the user as an input to the artificial intelligent agent to cause generation of feedback to the user on the content composed by the user, the feedback being dependent on the artificial intelligent agent; controlling a submission based on the content composed by the user; and causing the feedback to be provided to the user.

According to various, but not necessarily all, embodiments there is provided a method. The method comprises obtaining a value of one or more parameters which vary with actions of a user. The method comprises accessing an artificial intelligent agent configured to use one or more trained machine learning models selected from a plurality of differently trained machine learning models. The selection is based on the obtained value of one or more parameters. The plurality of differently trained machine learning models are configured to provide respective outputs. The method comprises providing content composed by the user as an input to the artificial intelligent agent to cause generation of feedback to the user on the content composed by the user. The feedback is dependent on the artificial intelligent agent.

The method comprises controlling a submission based on the content composed by the user and causing the feedback to be provided to the user.

According to various, but not necessarily all, embodiments there is provided a computer program that, when run on a computer, performs: obtaining a value of one or more parameters which vary with actions of a user; accessing an artificial intelligent agent configured to use one or more trained machine learning models selected, from a plurality of differently trained machine learning models, based on the obtained value of one or more parameters, the plurality of differently trained machine learning models being configured to provide respective outputs; providing content composed by the user as an input to the artificial intelligent agent to cause generation of feedback to the user on the content composed by the user, the feedback being dependent on the artificial intelligent agent; controlling a submission based on the content composed by the user; and causing the feedback to be provided to the user.

According to various, but not necessarily all, embodiments there is provided a system. The system comprises means for obtaining a value of one or more parameters which vary with actions of a user. The system also comprises a plurality of differently trained machine learning models. The plurality of differently trained machine learning models are configured to provide respective outputs. The system comprises means for selecting one or more trained machine learning models, from the plurality of differently trained machine learning models, based on the obtained value of one or more parameters. The system comprises an artificial intelligent agent configured to use the selected one or more trained machine learning models. The system further comprises means for providing content composed by the user as an input to the artificial intelligent agent to cause generation of feedback to the user on the content composed by the user. The feedback is dependent on the artificial intelligent agent. The system comprises means for controlling a submission based on the content composed by the user and means for causing the feedback to be provided to the user.

According to various, but not necessarily all, embodiments there is provided an apparatus comprising: at least one processor; and at least one memory including computer program code, the at least one memory and the computer program code configured to, with the at least one processor, cause the apparatus at least to perform: obtaining a value of one or more parameters which vary with actions of a user; accessing an artificial intelligent agent configured to use one or more trained machine learning models selected, from a plurality of differently trained machine learning models, based on the obtained value of one or more parameters, the plurality of differently trained machine learning models being configured to provide respective outputs; providing content composed by the user as an input to the artificial intelligent agent to cause generation of feedback to the user on the content composed by the user, the feedback being dependent on the artificial intelligent agent; controlling a submission based on the content composed by the user; and causing the feedback to be provided to the user.

According to various, but not necessarily all, embodiments there is provided a computer program, computer product, machine readable medium, or non-transitory computer readable medium, comprising instructions stored thereon for performing at least the following: obtaining a value of one or more parameters which vary with actions of a user; accessing an artificial intelligent agent configured to use one or more trained machine learning models selected, from a plurality of differently trained machine learning models, based on the obtained value of one or more parameters, the plurality of differently trained machine learning models being configured to provide respective outputs; providing content composed by the user as an input to the artificial intelligent agent to cause generation of feedback to the user on the content composed by the user, the feedback being dependent on the artificial intelligent agent; controlling a submission based on the content composed by the user; and causing the feedback to be provided to the user.

According to various, but not necessarily all, embodiments there is provided examples as claimed in the appended claims.

The following portion of this 'Brief Summary' section, describes various features that may be features of any of the embodiments described in the foregoing portion of the 'Brief Summary' section. The description of a function should additionally be considered to also disclose any means suitable for performing that function.

In some examples providing the content composed by the user as an input to the artificial intelligent agent causes a selection between a first process for controlling a submission based on the content composed by the user and a second, different process for controlling a submission based on the content composed by the user.

The selection between the first process and the second process may be dependent on the artificial intelligent agent.

The second process may provide the feedback before enabling a submission based on the content composed by the user.

The first process for controlling a submission based on the content composed by the user may comprise automatic submission based on the content composed by the user.

In some examples an input, based on a subject that is addressed by the content composed by the user, is provided to the artificial intelligent agent. The selected one or more trained machine learning models may be configured to generate content addressing the subject. The selection between the first and second process for controlling a submission based on the content composed by the user may be dependent on a comparison, by the artificial intelligent agent, of the generated content with the content composed by the user.

The subject may be obtained from further content which has been provided to the user.

The further content may have been rendered to the user in a period of time or period of user interaction time directly preceding composition of the content composed by the user.

The subject may be obtained by processing the content composed by the user.

The selected one or more trained machine learning models may be configured to generate content addressing the content composed by the user. The selection between the first and second process for controlling a submission based on the content composed by the user may be dependent on a sentiment classification, by the artificial intelligent agent, of the generated content.

The selected one or more trained machine learning models may be applied to the provided content composed by the user.

The feedback may be dependent on one or more outputs of the selected one or more trained machine learning models.

The plurality of differently trained machine learning models may be personalized to the user.

The plurality of differently trained machine learning models may be trained using training data comprising previous content composed by the user.

In some examples the previous content composed by the user is classified according to a value, obtained when the previous content was composed, of the one or more parameters which vary with actions of the user. Different sets of training data may be formed from differently classified previous content. Respective different machine learning models may be trained on respective different sets of training data so as to provide the plurality of differently trained machine learning models.

The one or more parameters which vary with actions of the user may comprise parameters which parameterize mood profiles of the user. The selection of one or more trained machine learning models may comprise selecting one or more trained machine learning models which have been trained on previous content composed by the user in a different mood profile to the present mood profile of the user.

Parameters which parameterize mood profiles of the user may comprise one or more of: a time-of-day at which the content is composed by the user; a real-world location from where the content is composed by the user; a subject that the content composed by the user is addressing; a sentiment classification of the content composed by the user; or biometric parameters of the user when the content is composed by the user.

The one or more parameters which vary with actions of the user may comprise one or more intended recipients of the content composed by the user. The selection of one or more trained machine learning models may comprise selecting one or more trained machine learning models which have been trained on previous content composed by the user for a similar one or more intended recipients.

In some examples the one or more intended recipients may be determined based on a platform on which the content is composed by the user and/or a recipient field of the content composed by the user.

The provision of content composed by a user as an input to the artificial intelligent agent may be responsive to a user input requesting a submission based on the content composed by the user.

The one or more trained machine learning models may be comprised in one layer of the artificial intelligent agent.

One or more other layers may comprise one or more evaluative modules configured to evaluate the one or more respective outputs of the selected one or more trained machine learning models.

BRIEF DESCRIPTION

Figure 2:
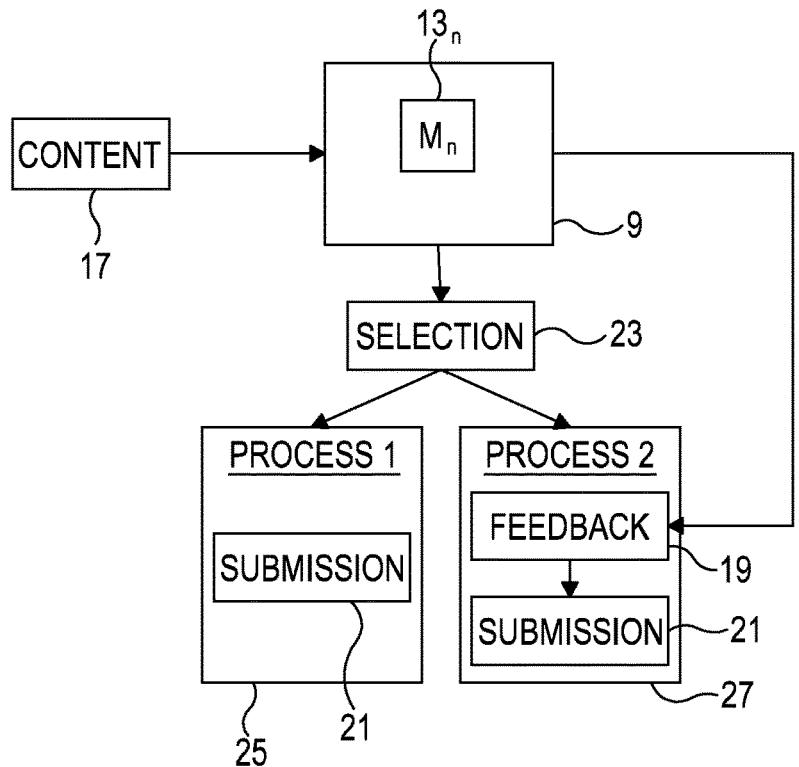
Figure 3:
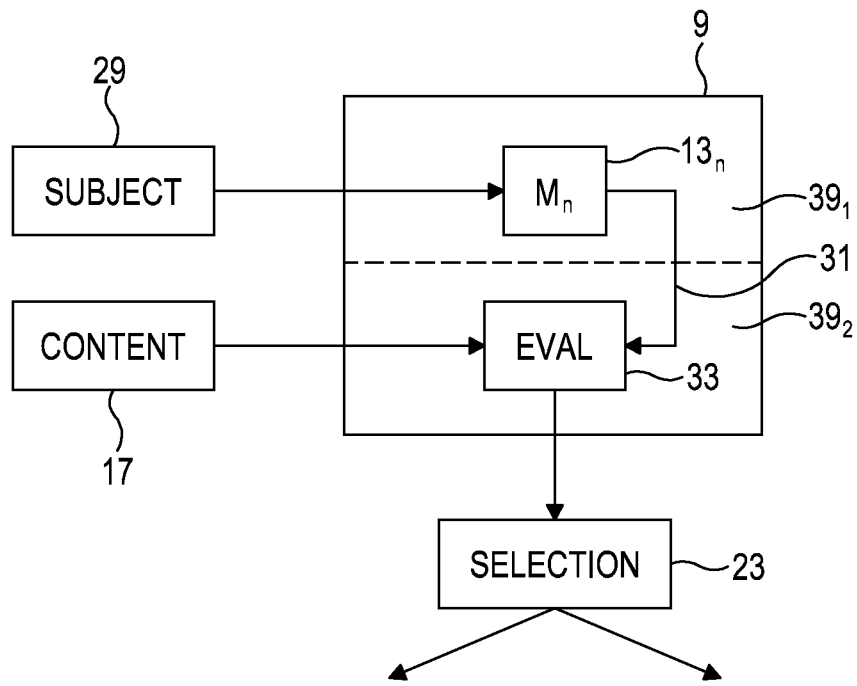
Figure 4:
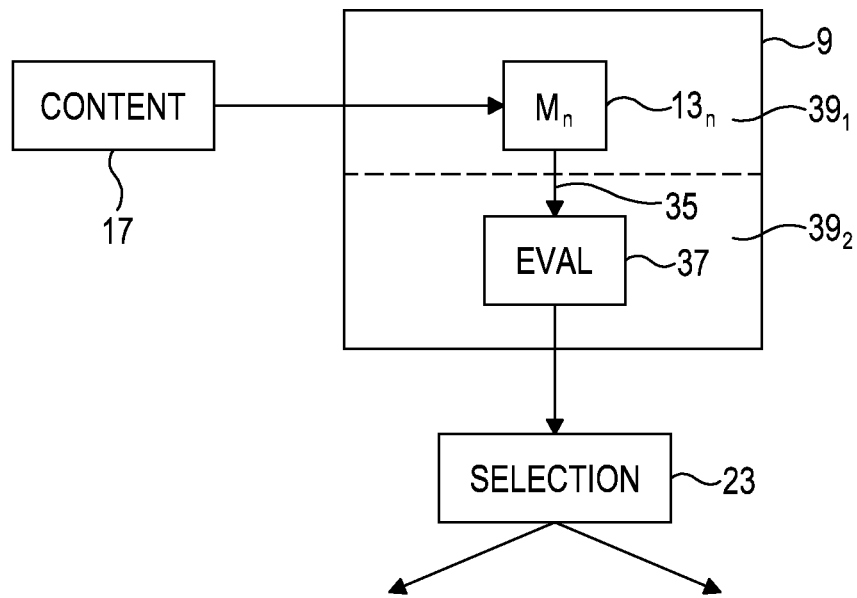
Figure 5:
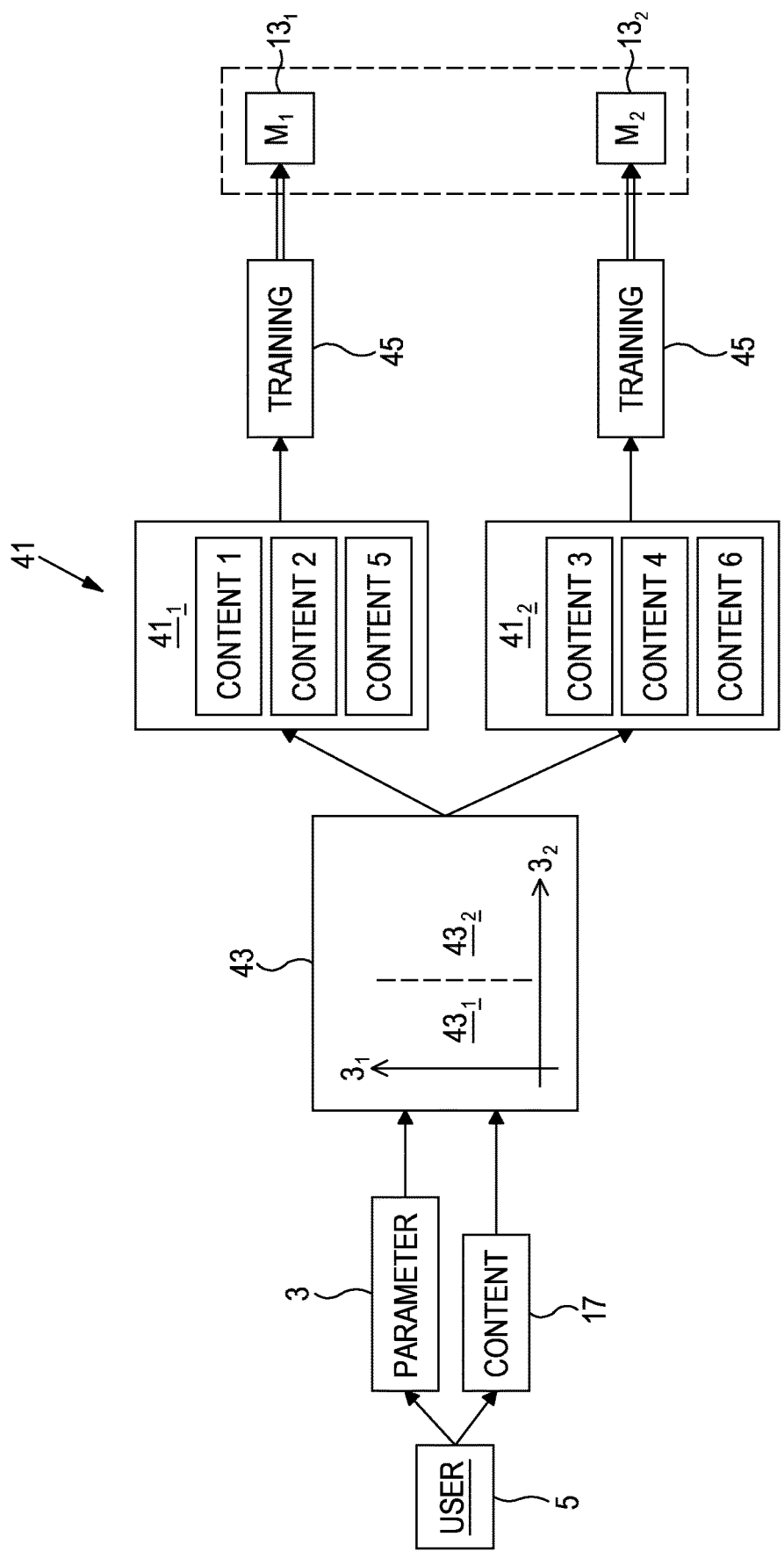
Figure 6:
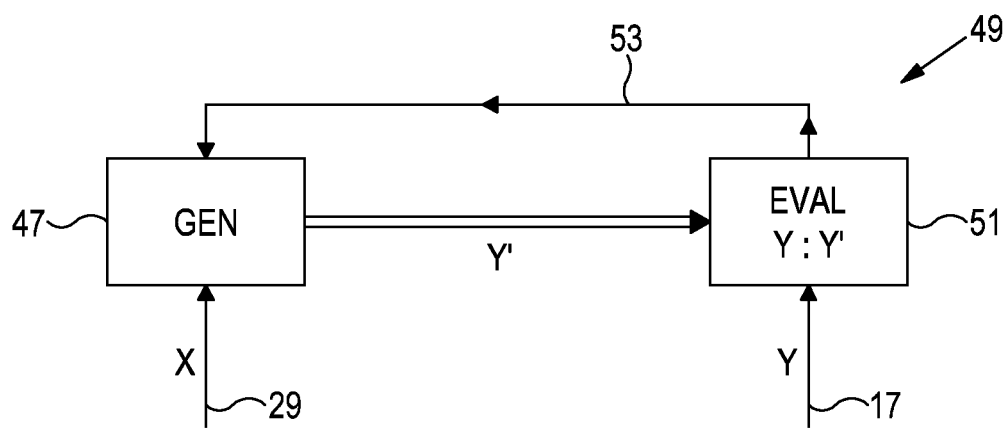
Figure 7:
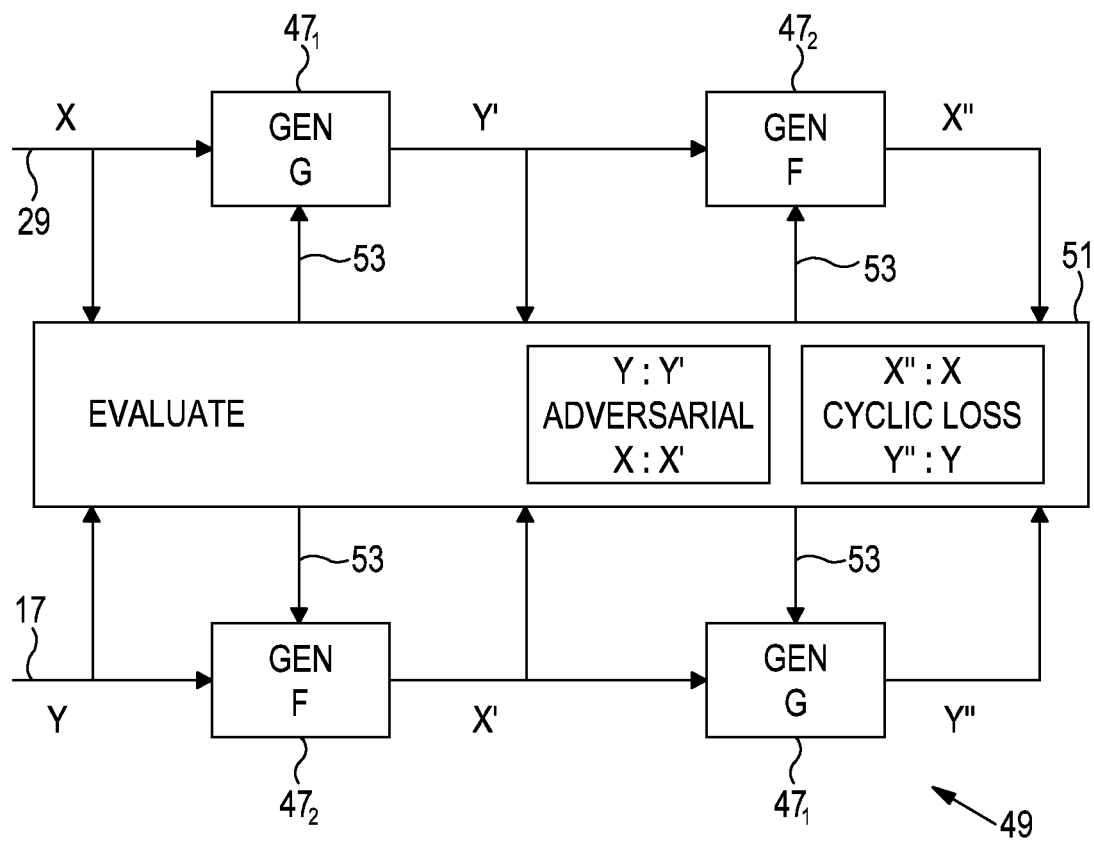
Figure 8:
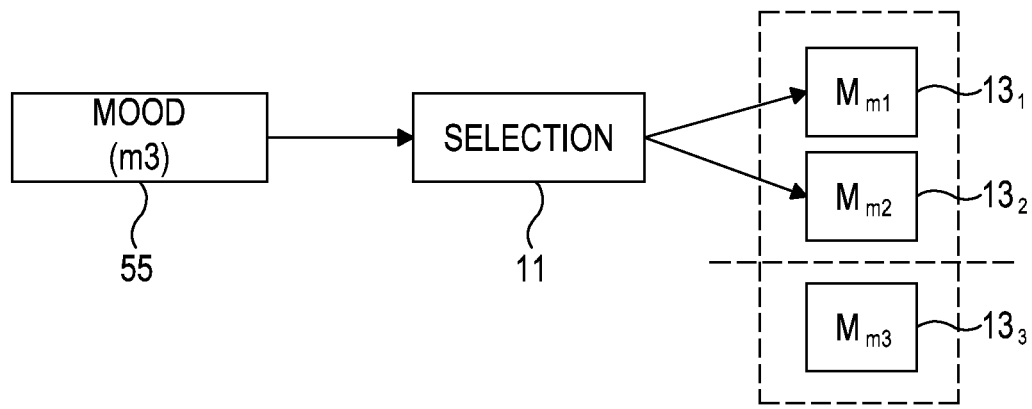
Figure 9:
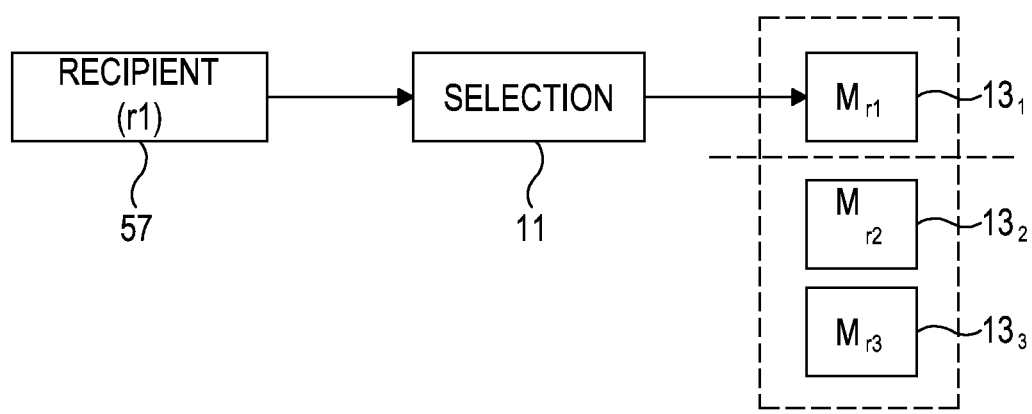
Figure 10:
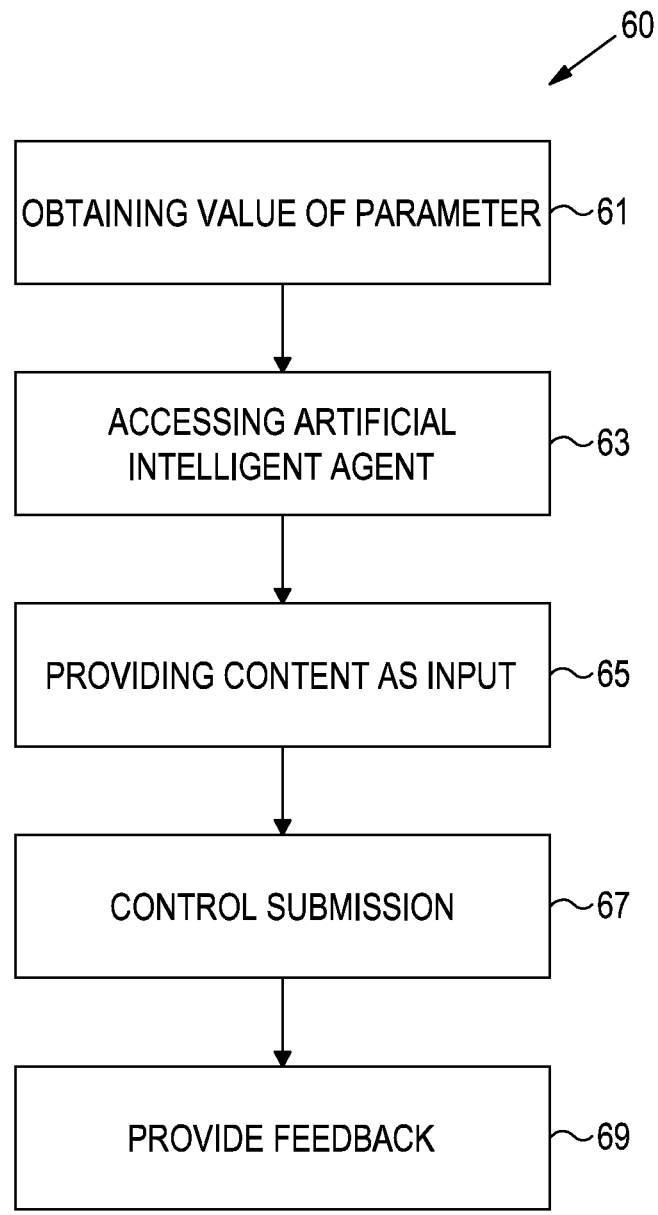
Figure 11:
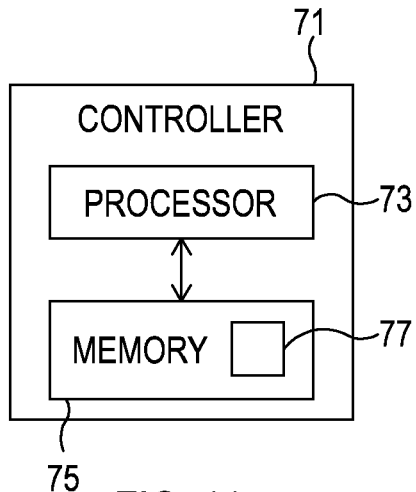
Figure 12:
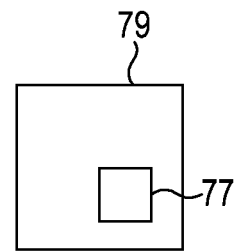
Figure 13:
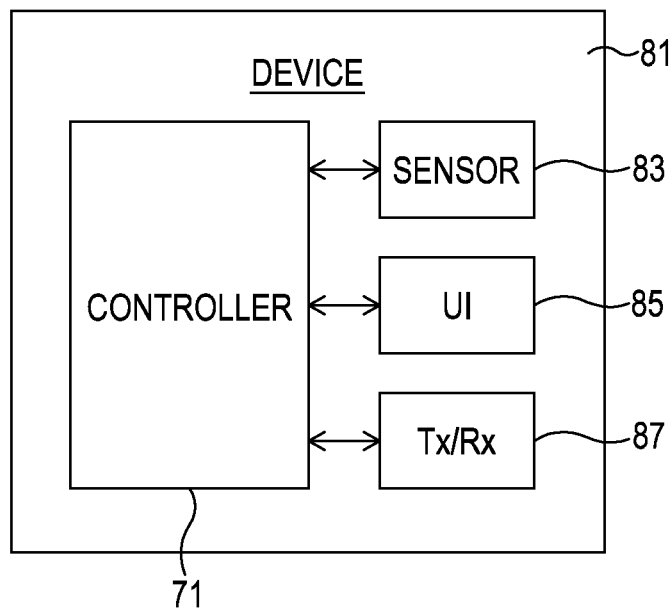

Some examples will now be described with reference to the accompanying drawings in which:

FIG. 1 schematically illustrates an example of an apparatus as described herein;

FIG. 2 schematically illustrates an example of processes for controlling a submission as described herein;

FIGS. 3 and 4 schematically illustrate examples of selection between processes for controlling a submission as described herein;

FIGS. 5 to 7 schematically illustrate examples of training machine learning models as described herein;

FIGS. 8 and 9 schematically illustrate examples of selection of one or more trained machine learning models as described herein;

FIG. 10 schematically illustrates an example of a method as described herein;

FIG. 11 schematically illustrates an example of a controller as described herein;

FIG. 12 schematically illustrates an example of a delivery mechanism as described herein; and FIG. 13 schematically illustrates an example of a device as described herein.

DETAILED DESCRIPTION

The FIGS illustrate examples of an apparatus 1 for controlling submission 21 of user-composed content 17.

FIG. 1 schematically illustrates a user 5 and an example of the apparatus 1.

The apparatus 1 obtains a value of one or more parameters 3 which vary with actions 7 of the user 5. The parameters 3 may be personalized to a user 5 and may vary in real time. The identity of the user 5 is not one of these parameters 3. The parameters 3 may parameterize actions 7 of the user 5. The one or more parameters 3 may be specifiable by action 7 of the user 5 or may parameterize measured actions 7 of the user 5.

The actions 7 may indicate the mood of the user 5. For example, the actions 7 can include physical or digital activities of the user 5 and behavioral biometric identifiers such as, for example, facial expression or voice tone. Additionally or alternatively, the actions 7 can indicate who the user 5 intends to address with content 17 that they compose 15. Such actions can include digital activities of the user 5 at the apparatus 1.

Obtaining a value of the one or more parameters 3 may comprise: measuring the one or more parameters 3; receiving a value from one or more sensors configured to measure the one or more parameters 3; determining a value by processing data received from said sensors; determining a value by processing digital activities of the user 5 at the apparatus 1.

The apparatus 1 accesses an artificial intelligent agent 9 configured to use selected one or more trained machine learning models $13_n$. The artificial intelligent agent 9 is configured to use the selected one or more trained machine learning models $13_n$ to assess an input to the artificial intelligent agent 9. The selected one or more trained machine learning models $13_n$ result from selection 11 from a plurality of differently trained machine learning models $13_1$, $13_2$ which are configured to provide respective outputs. Different ones of the plurality of trained machine learning models $13_1$, $13_2$ are configured to provide differently trained outputs.

The selection 11 of the one or more trained machine learning models $13_n$ from the plurality of differently trained machine learning models $13_1$, $13_2$ is based on the obtained value of the one or more parameters 3 which vary with actions 7 of the user 5.

In accessing the artificial intelligent agent 9, the apparatus 1 may cause the selection 11 of the one or more trained machine learning models $13_n$, from the plurality of differently trained machine learning models $13_1$, $13_2$, based on the obtained value of the one or more parameters 3 which vary with actions 7 of the user 5.

In some examples, such as the example of FIG. 1, accessing the artificial intelligent agent 9 comprises the selection 11 of the one or more trained machine learning models $13_n$ from the plurality of differently trained machine learning models $13_1$, $13_2$. The accessed artificial intelligent agent 9 comprises the selected one or more trained machine learning models $13_n$ but may not, as a result of the selection 11, comprise the unselected ones of the plurality of trained machine learning models $13_1$, $13_2$.

In other examples, the selection 11 of the one or more trained machine learning models $13_n$ from the plurality of differently trained machine learning models $13_1$, $13_2$ is implemented by the artificial intelligent agent 9. The accessed artificial intelligent agent 9 may comprise the plurality of trained machine learning models $13_1$, $13_2$ but is configured, by the selection 11, not to use the unselected ones of the plurality of trained machine learning models $13_1$, $13_2$.

In some examples, the accessed artificial intelligent agent 9 is formed by operably connecting the selected one or more trained machine learning models $13_n$ with invariant, predetermined components (for example, components for receiving and/or processing inputs and/or outputs) of the artificial intelligent agent 9.

In some examples, the accessed artificial intelligent agent 9 is formed by operably connecting the selected one or more trained machine learning models $13_n$ with other components which are ad-hoc selected based on the selected one or more trained machine learning models $13_n$.

In some examples, the accessed artificial intelligent agent 9 is selected from predetermined artificial intelligent agents based on the condition of comprising the selected one or more trained machine learning models $13_n$.

The artificial intelligent agent 9 comprises a software entity (or software entities) which acts on behalf of the user 5 to assess an input. The artificial intelligent agent 9 assesses an input on behalf of the user 5. The artificial intelligent agent outputs its assessment of the input. Its assessment can enable feedback on the input to the user 5. Its assessment may, in some examples, comprise a decision, taken on behalf of the user 5, in regards to how the input should be processed. The artificial intelligent agent 9 may be an autonomous agent. The artificial intelligent agent 9 may have autonomy in achieving a goal of outputting an assessment of the input which is most useful for the user 5. For this purpose, the artificial intelligent agent 9 may decide which of the plurality of the differently trained machine learning models $13_1$, $13_2$ to use based on a further input such as, for example, the obtained value of the one or more parameters 3 that vary with actions 7 of the user 5.

Though illustrated as being located at the apparatus 1 in the example of FIG. 1, it is to be appreciated that the artificial intelligent agent 9 may be remote from the apparatus 1. For example, it may be located in the Cloud. The artificial intelligent agent 9 may also be a distributed agent wherein part of the artificial intelligent agent 9 is located at the apparatus 1 and another part of the artificial intelligent agent 9 is remote from the apparatus 1. For example, the selected one or more trained machine learning algorithms $13_n$ may be remote from the apparatus 1.

The apparatus 1 provides content 17 composed 15 by the user 5 as an input to the artificial intelligent agent 9 to cause generation of feedback 19 to the user 5. The feedback 19 comprises feedback on the content 17 composed 15 by the user 5. The feedback 19 is dependent on the artificial intelligent agent 9.

As the components (for example, the selected one or more trained machine learning algorithms $13_n$) of the accessed artificial intelligent agent 9 are dependent on the obtained value of the one or more parameters 3 which vary with actions 7 of the user 5, the feedback 19 may vary with actions 7 of the user 5. For the same content 17, the feedback 19 generated can be different when actions 7 of the user 5 are different at the time of or in the time period preceding the composition 15 of the content 17.

The content 17 composed 15 by the user 5 may be or comprise any one or more of text content, graphical content such as image or video content, or audio content such as voice content. The content 17 may be composed 15 at the apparatus 1 or otherwise obtained by the apparatus 1 from one or more user interfaces, at which the content 17 is composed 15 and which are connected to or networked with the apparatus 1.

The feedback 19 may comprise one or more of: visual output (including for example text, images, or video), audio output, or haptic output, or any other form of output which can be perceived by the user 5.

In some examples, the provision of the content 17 composed 15 by the user 5 as an input to the artificial intelligent agent 9 is responsive to a user input requesting a submission 21 based on the content 17. In such examples the obtaining of a value of the one or more parameters 3 and the accessing of the artificial intelligent agent 9 may be background processes and their operations may be transparent, or at least substantially transparent, to the user 5. Values of the one or more parameters 3 can be continuously or periodically obtained by, respectively, continuous or periodic monitoring of the one or more parameters 5. The accessed artificial intelligent agent 9 can be updated in response to changes in the value of the one or more parameters 3.

In other examples, the obtaining of a value of the one or more parameters 3 is only triggered when a user input requesting a submission 21 based on the content 17 is made. The artificial intelligent agent 9 is not accessed in advance as part of a background process.

The apparatus 1 controls a submission 21 based on the content 17 composed 15 by the user 5 and causes feedback 19 to be provided to the user 5. In some examples the feedback 19 is provided to the user 5 before the submission 21 but in other examples the feedback 19 may be accessible to or provided to the user 5 at a later time, for example after the submission 21 or as part of a periodic activity review.

The submission 21 can cause transmission from a client device of the user 5 to a client device of another user or to a server.

FIG. 2 schematically illustrates an application of the artificial intelligent agent 9 for the purpose of selection 23 between different processes 25, 27 for controlling the submission 21 of content 17 composed 15 by the user 5.

In this example the provision of the content 17 composed 15 by the user 5 as an input to the artificial intelligent agent 9 causes a selection 23 between a first process 25 for controlling a submission 21 based on the content 17 composed 15 by the user 5 and a second, different process 27 for controlling a submission 21 based on the content 17 composed by the user 5. The selection 23 between the first process 25 and the second process 27 is dependent on the artificial intelligent agent 9.

As the components (for example, the selected one or more trained machine learning algorithms $13_n$) of the accessed artificial intelligent agent 9 are dependent on the obtained value of the one or more parameters 3 which vary with actions 7 of the user 5, the outcome of selection 23 may vary with actions 7 of the user 5.

For the same content 17, a submission 21 based on the content 17 may be controlled in accordance with the first process 25 when the user 5 acts 7 in a first manner at the time of or in the time period preceding the composition 15 of the content 17 and a submission 21 based on the content 17 may be controlled in accordance with the second, different process 27 when the user 5 acts 7 in a second, different manner at the time of or in the time period preceding the composition 15 of the content 17.

The second process 27 provides the feedback 19 to the user 5, on the content 17 composed 15 by the user 5, before enabling a submission 21 based on the content 17 composed 15 by the user 5. In some examples the first process 25 for controlling a submission 21 based on the content 17 composed 15 by the user 5 comprises automatic submission based on the content 17 composed 15 by the user 5. Feedback 19 is not provided to the user 5 under the first process 25.

Therefore, the selection 23, which is dependent on the artificial intelligent agent 9, dynamically implements objectively differentiable and specific adaptations to the process of controlling the submission 21 at the apparatus 1. The provision of feedback 19 before enabling a submission 21, in accordance with the second process 27, changes the nature of controlling a submission 21 from submission in the absence of feedback 19 to submission only with the provision of prior feedback 19.

In some examples of the second process 27, the submission 21 may be disabled until it is determined that the content 17 has been changed by the user 5. The submission 21 may be disabled until the generated feedback 19 changes in response to changes to the content 17. In some other examples of the second process 27, the submission 21 may be disabled for a period of time following the provision of the feedback 19 to the user 5.

Feedback 19 can be generated regardless of the selected process 25, 27 for controlling a submission 21 based on the content 17 and can be stored and/or made available to the user 5 subsequent to the conclusion of the selected process 25, 27.

In some examples the selection 23 may be implemented by the artificial intelligent agent 9. The artificial intelligent agent 9 can be a distributed agent in which the selection 23 takes place at the apparatus 1 while the selected one or more trained machine learning models $13_n$, used by and/or comprised in the artificial intelligent agent 9, are located remotely from the apparatus 1. In other examples the selection 23 may be based on a first output of the artificial intelligent agent 9. The feedback 19 to the user 5 on the content 17 composed 15 by the user 5 may be based upon a second output of the artificial intelligent agent 9.

While not illustrated in FIG. 2, the submission 21 in the first process 25 illustrated in FIG. 2 is based on the content 17 composed 15 by the user 5 and the submission 21 in the second process 27 illustrated in FIG. 2 is based on the content 17 composed 15 by the user 5.

FIGS. 3 and 4 schematically illustrate the role of the selected one or more trained machine learning models $13_n$ in relation to the selection 23 between the first and second processes 25, 27.

In the example of FIG. 3 the apparatus 1 provides an input, based on a subject 29 that is addressed by the content 17 composed 15 by the user 5, to the artificial intelligent agent 9. The selected one or more trained machine learning models $13_n$ are configured to generate content 31 addressing the subject 29. For example, the training data on which they were trained may have comprised both a subject and content responding to that subject.

The selection 23 between the first and second processes 25, 27 for controlling a submission 21 based on the content 17 composed 15 by the user 5 is dependent on a comparison, by the artificial intelligent agent 9, of the generated content 31 with the content 17 composed 15 by the user 5.

In some examples the artificial intelligent agent 9 comprises an evaluative module 33 which compares the generated content 31 to the content 17 composed by the user 5 in order to determine a difference measure. The difference measure can be compared against a threshold value to determine a binary result. The evaluative module 33 outputs either the difference measure or the binary result. The selection 23 may be based upon the binary result. Where the result indicates a threshold or above threshold similarity, the first process 25 may be selected 23. Where the result indicates a below threshold similarity, the second process 27 may be selected 23.

The output of the evaluative module 33 may constitute a first output of the artificial intelligent agent 9. Therefore, the first output of the artificial intelligent agent 9 may be based on comparison of the generated content 31 with the content 17 composed 15 by the user 5.

In some examples the subject 29 is obtained from further content which has been provided to the user 5 such that it may be seen, heard, or otherwise perceived by the user 5. The further content may have been composed by another user. The further content may comprise any one or more of text content, graphical content such as image or video content, or audio content such as voice content. The further content may be restricted to content that has been provided to the user 5 in a period of time or in a period of user interaction time directly preceding the composition 15 of the content 17 by the user 5. Thus, it can be assumed that the content 17 composed 15 by the user 5 is responding to (addressing) the further content provided to the user 5.

In other examples, the subject 29 is obtained by processing the content 17 composed 15 by the user 5. For example, computational semantic analysis can be used to identify key words or sentiments in the content 17. An example of computational semantic analysis is natural language processing.

The subject 29 may be an input to the artificial intelligent agent 9 or may be determined by the artificial intelligent agent 9 from the content 17 provided as an input to the artificial intelligent agent 9 or from the further content, provided to the user 5, which is input to the artificial intelligent agent 9.

In the example of FIG. 4 the selected one or more trained machine learning models $13_n$ are configured to generate content 35 addressing the content 17 composed 15 by the user 5. In this example the selection 23 between the first and second processes 25, 27 for controlling a submission 21 based on the content 17 composed 15 by the user 5 is dependent on a sentiment classification, by the artificial intelligent agent 9, of the generated content 35. In some examples the sentiment classification determines a polarity (positive/negative sentiment) of the generated content 35. In other examples the sentiment classification may be more advanced, beyond polarity, and may determine emotional states.

In some examples the artificial intelligent agent 9 comprises an evaluative module 37 which performs sentiment classification of the generated content 35. The output of the evaluative module 37 may constitute a first output of the artificial intelligent agent 9. Therefore, the first output of the artificial intelligent agent 9 may be based on sentiment classification of the generated content 35.

In some examples the selection 23 is based on the polarity determined by the sentiment classification. For positive sentiments, the first process 25 may be selected 23. For negative sentiments, the second process 27 may be selected 23. In other examples the selection 23 is based on the emotional state(s) determined by the sentiment classification.

In the example of FIG. 4 the apparatus 1 applies the selected one or more trained machine learning models $13_n$ to the provided content 17 composed 15 by the user 5.

In some examples the feedback 19 is dependent on one or more outputs 31, 35 of the selected one or more trained machine learning models $13_n$. These one or more outputs 31, 35 may constitute second outputs of the artificial intelligent agent 9. In these examples the feedback 19 comprises generated content 31, 35 which addresses either the content 17 composed 15 by the user 5 or the subject 29 that the content 17 composed 15 by the user 5 is addressing.

As shown in FIGS. 3 and 4 the artificial intelligent agent 9 may be configured with a layered architecture. In examples where the artificial intelligent agent 9 is a distributed agent, the distribution may be on an inter-layer basis rather than on an intra-layer basis. The selected one or more trained machine learning models $13_n$ are comprised in one layer $39_1$ of the artificial intelligent agent 9. Additionally, in some examples, one or more other layers $39_2$ comprise one or more evaluative modules 33, 37 which are configured to evaluate the one or more respective outputs of the selected one or more trained machine learning models $13_n$. Although not shown in FIGS. 3 and 4, the selection 23 between the first and second processes 25, 27 for controlling a submission 21 based on the content 17 composed 15 by the user 5 may be implemented in another one or more layers of the artificial intelligent agent 9.

In some examples the components of individual layers $39_1$, $39_2$ are independent of each other and act in parallel. The different layers $39_1$, $39_2$ perform different kinds of operations. For example, the layer $39_1$ comprising one or more trained machine learning models generates content responding to an input whereas the layer $39_2$ comprising evaluative modules may determine a polarity (positive/negative sentiment) of an input.

FIG. 5 schematically illustrates an example of training machine learning models. The plurality of differently trained machine learning models $13_1$, $13_2$ are personalized to a user 5. The plurality of differently trained machine learning models $13_1$, $13_2$ are trained using training data 41 comprising previous content 17 composed 15 by the user 5. In some examples the training data 41 may also comprise the subject 29 that is addressed by the previous content 17 composed 15 by the user 5.

The plurality of differently trained machine learning models $13_1$, $13_2$ are trained to generate content as if composed 15 by the user 5 or to generate content which comprises a response to an input as if by the user 5. The content generated by the trained machine learning models $13_1$, $13_2$ is simulated content. The plurality of differently trained machine learning models $13_1$, $13_2$ are trained to output respective simulated content.

In use in the artificial intelligent agent 9, the differently trained machine learning models $13_1$, $13_2$ may not be fixed, pretrained algorithms and may instead be dynamically updated, continuing to learn from content 17 composed 15 by the user 5.

In some examples the apparatus 1 is involved in the training. As schematically illustrated in FIG. 5 the apparatus 1 classifies 43 the previous content 17 composed 15 by the user 5 based on a value, obtained when the previous content 17 was composed 15, of the one or more parameters 3 which vary with actions 7 of the user 5. In some examples, as described further in relation to FIGS. 8 and 9 below, the previous content 17 is classified 43 according to a mood profile 55 of the user 5 and/or an intended recipient 57 of the content 17.

As schematically illustrated in the example of FIG. 5, the classification 43 of the previous content 17 is defined in respect of a parameter space. The parameter space is defined by the one or more parameters 3 which vary with actions 7 of the user 5. Each dimension of the parameter space is represented by a different one $3_1$, $3_2$ of one or more parameters 3 which vary with actions 7 of the user 5. Although the parameter space is illustrated in two dimensions in FIG. 5 it is to be appreciated that the parameter space may be one-dimensional or multi-dimensional with the number of dimensions corresponding to the number of parameters 3 which vary with actions 7 of the user 5. Thus, the parameter space is spanned by the one or more parameters 3 which vary with actions 7 of the user 5.

In this example the parameter space is divided into a plurality of defined subspaces, each associated with a different classification $43_1$, $43_2$ of the previous content 17. Thus, if values of the one or more parameters 3 describe a point within a subspace, those values are indicative of the classification $43_1$, $43_2$ associated with that particular subspace.

In some examples the definition of the subspaces associated with different classification $43_1$, $43_2$ of the previous content 17 is determinative, according to a set of rules (or a specified algorithm) which define boundaries in respect of different ones $3_1$, $3_2$ of one or more parameters 3.

In other examples the definition of the subspaces associated with different classification $43_1$, $43_2$ of the previous content 17 is controlled by machine learning (or an unspecified algorithm).

The machine learning can be supervised, such as classification in the parameter space. During the learning, the user 5 may be prompted to label the previous content 17 with an appropriate classification $43_1$, $43_2$.

The machine learning can also be unsupervised, such as clustering in the parameter space, for example K-means clustering in the parameter space. The user 5 may be prompted to label different clusters with an appropriate classification $43_1$, $43_2$. This may be achieved by prompting the user 5 to label a subset of previous content 17 with an appropriate classification $43_1$, $43_2$, the presence of that previous content 17 in a particular cluster therefore providing a label for the whole cluster.

The machine learning to define the subspaces associated with different classification $43_1$, $43_2$ of the previous content 17 can be implemented by a pretrained algorithm or by a dynamically updated algorithm.

In the example of FIG. 5 the apparatus 1 forms different sets of training data $41_1$, $41_2$ from differently classified $43_1$, $43_2$ previous content 17. Different sets of training data $41_1$, $41_2$ correspond to differently classified $43_1$, $43_2$ previous content 17.

In this example the apparatus 1 trains 45 a plurality of respective different machine learning models $13_1$, $13_2$ on respective different sets of training data $41_1$, $41_2$. Therefore, a plurality of differently trained machine learning models $13_1$, $13_2$ are obtained wherein different ones of the plurality of differently trained machine learning models $13_1$, $13_2$ have been trained on different sets of training data $41_1$, $41_2$ so as to provide respective outputs.

In some examples the training 45 of the respective different machine learning models can be performed remotely, for example at one or more remote devices or entities, and the apparatus 1 may be configured to transmit the different sets of training data $41_1$, $41_2$ to the one or more remote devices or entities which perform the training 45.

In some examples the machine learning models $13_1$, $13_2$ are respectively trained 45 to translate data input into content responding to that input as if by the user 5. The trained machine learning models $13_1$, $13_2$ may comprise artificial neural networks.

In some examples, the machine learning models $13_1$, $13_2$ may use a sequence-to-sequence (seq2seq) framework based on recurrent neural networks (RNN) as now described:

The machine learning models $13_1$, $13_2$ may each comprise any suitable means for transforming data input into a sequence of discrete items. Such suitable means can depend on the form of the data input. Examples of suitable means include a deep convolutional neural network configured to convert data input in the form of an image into image feature vectors which can be mapped into a sequence by a linear transformation and/or an encoder to convert words in text sentences comprised in the data input into their one-hot vector representations in accordance with a stored vocabulary, the one-hot vectors then being concatenated to form a sequence.

In these examples, the machine learning models $13_1$, $13_2$ additionally each comprise a first RNN, such as a first long short-term memory (LSTM) model, which is configured to read the data input in the form of a sequence of discrete items and is configured to map the sequence to a fixed-size vector. The machine learning models $13_1$, $13_2$ each comprise a second RNN, such as a second LSTM model, which is configured to receive the fixed-size vector as an input and to map the fixed-size vector to an output sequence representing content responding to the data input as if by the user 5.

The output sequence representing content responding to the data input as if by the user 5 is obtained by selecting the most likely output sequence according to a probability distribution over all words in the stored vocabulary, this probability distribution being produced by the second RNN.

In one example of training 45, the machine learning models $13_1$, $13_2$ can be given the subject 29 as a data input and can be given the previous content 17 composed by the user 5 in response to the subject 29 (pair-wise) so that learning can be done by backpropagation. The machine learning models $13_1$, $13_2$ are trained 45 by backpropagating the cross-entropy loss between the output sequence from the second RNN and the previous content 17 composed by the user 5 in response to the subject 29 and using an optimization algorithm such as gradient descent to minimize the cross-entropy loss.

The first machine learning model $13_1$ is only given subjects 29 and corresponding previous content 17 that are comprised in the first set of training data $41_1$. The second machine learning model $13_2$ is only given subjects 29 and corresponding previous content 17 that are comprised in the second set of training data $41_2$.

FIG. 6 schematically illustrates another example of the training 45 the machine learning models $13_1$, $13_2$, though in this case only the training of the first machine learning model $13_1$ is illustrated. The training 45 uses the first set of training data $41_1$. The previous content 17 composed 15 by the user 5 in the first set of training data $41_1$ and the subject 29 addressed by the previous content 17 composed 15 by the user 5 in the first set of training data $41_1$ may be paired.

Although only training 45 using the first set of training data $41_1$ to produce the first trained machine learning model $13_1$ is illustrated in FIG. 6, it is to be appreciated that the training 45 is also suitable for using other sets of training data 41 to produce other ones of the trained machine learning models.

The training 45 of the first machine learning model $13_1$ occurs by training the first machine learning model $13_1$ as a generative network 47 in a conditional generative adversarial network (GAN) 49. The conditional generative adversarial network 49 comprises the at least one generative network 47 that generates content from a subject (for example, the subject 29 addressed by the previous content 17 composed 15 by the user 5). The conditional generative adversarial network 49 also comprises at least one evaluative network 51 that evaluates similarity (for example in style, tone, diction and/or topic) between the generated content 31 and input previous content 17 composed 15 by the user 5 and provides a learning feedback 53 to the at least one generative network 47.

The similarity may be evaluated at any suitable level of abstraction. It may be evaluated at the level of the input data as received (such as previous content 17 as composed 15), or at a level corresponding to pre-processing of the input data (such as computational semantic analysis of the previous content 17) or even at a post-processing level, for example performance in relation to a task such as the provision of the feedback 19 to the user 5.

In the following, the subject 29 is referenced using X and the previous content 17, which addresses the subject 29, is referenced using Y. First order, simulated subject is referenced using X' (X'=F(Y)). First-order, generated content addressing the subject 29 (X) is referenced using Y' (Y'=G (X)). Second order, simulated subject is referenced using X" (X"=F(Y')=F(G(X))). Second-order, generated content addressing the first-order, simulated subject (X') is referenced using Y" (Y"=G(X')=G(F(Y))).

The previous content 17 (Y) is a response to the subject 29 (X) composed 15 by the user 5 and exhibits characteristics of being composed 15 by the user 5 when the user 5 is aligned with the first classification $43_1$. The generated content Y', Y" is not composed 15 by the user 5 but exhibits characteristics of being composed 15 by the user 5 when the user 5 is aligned with the first classification $43_1$.

The at least one generative network 47 is trained to learn a mapping G, such that Y'≈G(X). G generates realistic samples of the target domain Y from the source domain X.

The evaluative network 51 defines a discriminator $D_Y$ for distinguishing the generated samples Y'=G(X) that simulate the target domain from the real samples of the target domain Y.

The Generator 47 and Discriminator $D_Y$ play a game of trying to beat each other and in the process, both networks get better. More formally the objective is to learn a mapping function (generator) G between two domains X and Y given training samples $\{x_i\}_{i=1}^{N}$ where $x_i \in X$ and $\{y_j\}_{j=1}^{M}$ and where $x_i \in Y$.

Adversarial loss matches the distribution of generated data to the data distribution in the target domain.

$D_Y$ distinguishes between data {y} and translated data y'=G(x).

For mapping G: X→Y and discriminator $D_Y$, G tries to generate data G(x) that is similar to data from domain Y Adversarial discriminators $D_Y$ aims to distinguish between translated samples G(x) and real samples y.

The objective is set so that G aims to minimize it and D tries to maximize it, an example loss function is L(G, $D_Y$, X, Y)=log[$D_Y$ (y)]+log[1-$D_Y$(G(x))]. The objective is $\min_G \max_{DY}$ (L). Alternative loss functions are possible.

Thus the at least one generative adversarial network 49 learns a mapping G: X→Y such that the distribution of data from G(X) is indistinguishable from the distribution Y using adversarial loss.

As illustrated in FIG. 7, in some, but not necessarily all, examples, the generative adversarial network 49 is a cyclic generative adversarial network. This example of the cyclic generative adversarial network 49 comprises a first generative network $47_1$ that uses a first mapping G that maps subject 29 (X) to first-order, generated content Y'; a second generative network $47_2$ that uses a second mapping F that maps first-order, generated content Y' to second-order, simulated subject X"; and an evaluative network 51 that evaluates at least cyclic consistency loss to enforce second-order, simulated subject X" to be substantially similar to the subject 29 (X). The second-order, simulated subject X" is produced by the second mapping F from first-order, generated content Y', produced by the first mapping G from the subject 29 (X). This part of the cyclic generative adversarial network 49 enforces forward cyclic consistency from subject 29 (X) to first-order, generated content Y' via the mapping G, to second-order, simulated subject X" via the mapping F.

In some, but not necessarily all, examples, it may also be desirable to enforce reverse cyclic consistency. The reverse cycle is the consistency between the previous content 17 (Y) and second-order, generated content Y" where the second-order, generated content Y" is produced by the mapping G from first-order, simulated subject X' and the first-order, simulated subject X' is produced by the mapping F from the previous content 17 (Y).

The evaluative network 51 is configured to enforce second-order, generated content Y" to be substantially similar to the previous content 17 (Y). The second-order, generated content Y' being produced by the first mapping G, first-order, simulated subject X' produced by the second mapping F from the previous content 17 (Y). This is illustrated in the lower half of FIG. 7.

It will be appreciated that the evaluative network 51 performs adversarial optimization via feedback signals 53 using forward and/or reverse cyclic consistency as a constraint.

Two deep generator networks may be used to define the mapping G and the mapping F respectively. The mapping F generates realistic samples X'=F(Y) of the first domain X from the first domain X. The mapping G generates realistic samples Y'=G(X) of the second domain Y from a second domain Y. Two deep discriminator networks $D_X$, $D_Y$: distinguish the generated samples of the target domain from the real samples of the target domain $D_X$ distinguishes between data {x} and translated data F(y). $D_Y$ distinguishes between data {y} and translated data G(x). The Generators and Discriminators play a game of trying to beat each other and in the process, both networks get better. Adversarial loss matches the distribution of generated data to the data distribution in the target domain.

For mapping G: X→Y and discriminator $D_Y$, G tries to generate data G(x) that is similar to data from domain Y $D_Y$ aims to distinguish between translated samples G(x) and real samples y. The objective is set so that G aims to minimize it and $D_Y$ tries to maximize it, an example loss function is L(G, $D_Y$, X, Y)=log[$D_Y$(y)]+log[1-$D_Y$(G(x))], where the objective is $\min_G \max_{DY}$ (L). Alternative loss functions are possible.

For mapping F: Y→X and discriminator $D_X$, F tries to generate data F(y) that is similar to data from domain X $D_X$ aims to distinguish between translated samples F(y) and real samples x. The objective is set so that G aims to minimize it and $D_X$ tries to maximize it, an example loss function is L(F, $D_X$, Y, X)=log[$D_X$ (x)]+log[1-$D_X$(F(y))], where the objective is $\min_F \max_{DX}$ (L). Alternative loss functions are possible.

The system simultaneously learns a mapping G: X→Y such that the distribution of data from G(X) is indistinguishable from the distribution Y, and learns a mapping F: Y→X such that the distribution of data from F(Y) is indistinguishable from the distribution X and enforces cycle consistency such that F(G(X))~X, using adversarial loss. Optionally it also enforces cycle consistency such that G(F(Y))~Y. Minimizing cycle consistency losses prevent the learned mappings G and F from contradicting each other.

Forward cycle consistency requires that, for each data x from domain X, the translation cycle should be able to bring x back to its original version x→G(x)→F(G(x))=x.

Backward cycle consistency requires that, for each data y from domain Y, the translation cycle should be able to bring y back to its original version y→F(y)→G(F(y))=y.

It is therefore possible to create a create a cycle consistency loss function $L_{cyc}$ e.g. $L_{cyc}=\|F(G(x))-x\|+\|G(F(y))-y\|$.

The full objective for adversarial loss and cycle consistency is mine, F max DX, DY (L), where L=L(G, $D_Y$, X, Y)+L(F, $D_X$, Y, X)+$\lambda L_{cyc}$. $\lambda$ is a control parameter.

Though in the examples of FIGS. 6 and 7, the first machine learning model $13_1$ has been trained to generate content 31 addressing a subject 29, it is to be appreciated that the subject 29 could, in effect, be content 17 composed 15 by the user 5 and thus the accordingly trained machine learning algorithm $13_1$ can generate content 35 which addresses the content 17 composed 15 by the user 5.

The generative network 47 may use the sequence-to-sequence (seq2seq) framework based on recurrent neural networks (RNN) as previously described. Thus, the goal of the GAN 49 or cyclic GAN 49 is to trains the generative network 47 to generate a sequence of discrete items, for example words in a sentence.

In such a case, the operation for selecting the most likely output sequence according to the probability distribution, produced by the second RNN, may be approximated with a differentiable function such as the Gumbel-softmax distribution described in section 2 of Kusner, Matt J., and José Miguel Hernández-Lobato. "Gans for sequences of discrete elements with the gumbel-softmax distribution." *arXiv preprint arXiv:* 1611.04051 (2016).

Other method for applying GAN 49 to generating sequences exist. For example, the Generator can be modelled as a stochastic policy in reinforcement learning as described in Yu, Lantao, et al. "Seqgan: Sequence generative adversarial nets with policy gradient." *Thirty-First AAAI Conference on Artificial Intelligence.* 2017. In another example, an encoder of a trained auto-encoder can be used to generate a low-dimensional representation of the previous content 17 composed by the user 5 which can be supplied to the discriminator. The Generator is then trained to generate its own vectors in this space. Once trained, the output vectors from the Generator can be decoded to human readable sentences by the decoder of the same trained auto-encoder. This example is described in Donahue, David, and Anna Rumshisky. "Adversarial text generation without reinforcement learning." *arXiv preprint arXiv:* 1810.06640 (2018).

It is to be appreciated that, as a collective, the trained machine learning models $13_1$, $13_2$ may be able produce responses as if by the user 5 across multiple tasks. In some examples, different trained machine learning models $13_1$, $13_2$ may be specific to different tasks. Some trained machine learning models $13_1$, $13_2$ may be specific to the same task but are trained on different sets of training data $41_1$, $41_2$. Thus, these trained machine learning models $13_1$, $13_2$ are able to simulate a response of the user 5 to a same task across, for example, different mood profiles of the user 5 (as is described in relation to FIG. 8 below). Some trained machine learning models $13_1$, $13_2$ may be specific to different tasks but are trained on the same sets of training data $41_1$, $41_2$. As a collective, the trained machine learning models $13_1$, $13_2$ may be able to simulate a response of the user 5 across multiple different tasks and across, for example, multiple different mood profiles of the user 5.

FIGS. 8 and 9 schematically illustrate examples of the selection 11 of the one or more trained machine learning models $13_1$, $13_2$ to be used in the artificial intelligent agent 9.

In the example of FIG. 8 the one or more parameters 3 which vary with actions 7 of the user 5 comprise parameters which parameterize mood profiles 55 of the user 5. The selection 11 of one or more trained machine learning models $13_n$ comprises selecting one or more trained machine learning models $13_1$, $13_2$ which have been trained on previous content 17 composed 15 by the user 5 in a different mood profile to the present mood profile 55 of the user 5. One or more trained machine learning models $13_3$ which have been trained on previous content 17 composed 15 by the user 5 when the user 5 was exhibiting the same or similar mood profile as the present mood profile 55 of the user 5 may not be selected 11.

The selection 11 may comprise selection of one or more trained machine learning models $13_n$ from a subset of the plurality of differently trained machine learning models $13_1$, $13_2$, $13_3$, wherein the differently trained machine learning models $13_1$, $13_2$ comprised in the subset have been trained on previous content 17 composed 15 by the user 5 in a different mood profile to the present mood profile 55 of the user 5. One or more trained machine learning models $13_3$ which have been trained on previous content 17 composed 15 by the user 5 when the user 5 was exhibiting the same or similar mood profile as the present mood profile 55 of the user 5 are not comprised in the subset.

In some examples the parameters 3 which parameterize mood profile 55 of the user 5 comprise one or more of:
  a time-of-day at which the content 17 is composed 15 by the user 5;
  a real-world location from where the content 17 is composed 15 by the user 5;
  a subject that the content 17 composed 15 by the user 5 is addressing;
  a sentiment classification of the content 17 composed 15 by the user 5; or
  biometric parameters (such as, for example, facial expression, heart rate, and breathing rate) of the user when the content 17 is composed 15 by the user 5.

In the example of FIG. 9 the one or more parameters 3 which vary with actions 7 of the user 5 comprise one or more intended recipients 57 of the content 17 composed 15 by the user 5. The selection 11 of the one or more trained machine learning models $13_n$ comprises selecting one or more trained machine learning models $13_1$ which have been trained on previous content 17 composed 15 by the user 5 for a similar one or more intended recipient 57. One or more trained machine learning models $13_2$, $13_3$ which have been trained on previous content 17 composed 15 by the user 5 for dissimilar intended recipients may not be selected 11.

The intended recipient 57 is the person or persons who the user 5 is addressing with the content 17 or is otherwise the audience for the content 17.

In some examples the selection 11 of the one or more trained machine learning models $13_n$ which have been trained on previous content 17 composed 15 by the user 5 for a similar one or more intended recipient 57 comprises selecting one or more trained machine learning models $13_1$ which have been trained on previous content 17 composed 15 by the user 5 for:
  the same one or more intended recipients 57;
  one or more intended recipients 57 in a same group or classification as the present one or more intended recipients 57; or
  one or more intended recipients 57 having a relationship with the user 5 in common with a relationship of the present one or more intended recipients 57 with the user 5.

The selection 11 may comprise selection of one or more trained machine learning models $13_n$ from a subset of the plurality of differently trained machine learning models $13_1$, $13_2$, $13_3$, wherein the differently trained machine learning models $13_1$ comprised in the subset have been trained on previous content 17 composed 15 by the user 5 for a similar one or more intended recipient 57. One or more trained machine learning models $13_2$, $13_3$ which have been trained on previous content 17 composed 15 by the user 5 for dissimilar intended recipients are not comprised in the subset.

In some examples the apparatus 1 is configured to determine the one or more intended recipients 57 based on a platform on which the content 17 is composed 15 by the user 5. The platform may comprise a social media service, a website, a group chat, or other digital environments or digital communities.

In some examples the apparatus 1 is configured to determine the one or more intended recipients 57 based on the recipient field of the content 17 composed 15 by the user 5.

FIG. 10 illustrates an example of a method 60 for controlling submission 21 of user-composed content 17.

In block 61 of the method 60, one or more values of the one or more parameters 3, which vary with actions 7 of the user 5, are obtained.

In block 63 of the method 60, an artificial intelligent agent 9 is accessed. The artificial intelligent agent 9 that is accessed comprises one or more trained machine learning models $13_n$ selected 11 from the plurality of differently trained machine learning models $13_1$, $13_2$. The plurality of differently trained machine learning models $13_1$, $13_2$ are configured to provide respective outputs. The selection 11 is based on the obtained value(s) of one or more parameters 3.

In some examples the selection 11 may be implemented by the artificial intelligent agent 9. In such examples the obtained value(s) of one or more parameters 3 are provided as an input to the artificial intelligent agent 9.

In block 65 of the method 60, content 17 composed 15 by the user 5 is provided as an input to the artificial intelligent agent 9 to cause generation of feedback 19 to the user 5 on the content 17 composed 15 by the user 5. The feedback 19 is dependent on the artificial intelligent agent 9. For example, the feedback 19 may be based on one or more outputs 31, 35 of the selected one or more trained machine learning models $13_n$.

In block 67 of the method 60, a submission 21 based on the content 17 composed 15 by the user 5 is controlled.

In some examples the control is dependent on the artificial intelligent agent 9. For example, providing the content 17 as an input to the artificial intelligent agent 9, as per block 65, causes a selection 23 between a first process 25 for controlling a submission 21 based on the content 17 and a second, different process 27 for controlling a submission 21 based on the content 17. The selection 23 is dependent on the artificial intelligent agent 9. For example, the selection 23 may be implemented by the artificial intelligent agent 9 or may be based on a first output of the artificial intelligent agent 9 as described in relation to FIGS. 3 and 4 above.

In block 69 of the method 60, the feedback 19 is caused to be provided to the user 5.

In some examples, the second process 27 for controlling a submission 21 based on the content 17 composed 15 by the user 5 comprises providing the feedback 19 to the user 5 before enabling a submission 21 based on the content 17 composed 15 by the user 5.

FIG. 11 illustrates an example of a controller 71. Implementation of a controller 71 may be as controller circuitry. The controller 71 may be implemented in hardware alone, have certain aspects in software including firmware alone or can be a combination of hardware and software (including firmware).

As illustrated in FIG. 11 the controller 71 may be implemented using instructions that enable hardware functionality, for example, by using executable instructions of a computer program 77 in a general-purpose or special-purpose processor 73 that may be stored on a computer readable storage medium (disk, memory etc) to be executed by such a processor 73.

The processor 73 is configured to read from and write to the memory 75. The processor 73 may also comprise an output interface via which data and/or commands are output by the processor 73 and an input interface via which data and/or commands are input to the processor 73.

The memory 75 stores a computer program 77 comprising computer program instructions (computer program code) that controls the operation of the apparatus 1 when loaded into the processor 73. The computer program instructions, of the computer program 77, provide the logic and routines that enables the apparatus to perform the method illustrated in FIG. 10 and the functions described in relations to FIGS. 1 to 9. The processor 73 by reading the memory 75 is able to load and execute the computer program 77.

The apparatus 1 therefore comprises:
at least one processor 73; and
at least one memory 75 including computer program code
the at least one memory 75 and the computer program code configured to, with the at least one processor 73, cause the apparatus 1 at least to perform:
obtaining a value of one or more parameters 3 which vary with actions 7 of a user 5;
accessing an artificial intelligent agent 9 configured to use one or more trained machine learning models $13_n$ selected, from a plurality of differently trained machine learning models $13_1$, $13_2$, based on the obtained value of one or more parameters 3, the plurality of differently trained machine learning models $13_1$, $13_2$ being configured to provide respective outputs;
providing content 17 composed 15 by the user 5 as an input to the artificial intelligent agent 9 to cause generation of feedback 19 to the user 5 on the content 17 composed 15 by the user 5, the feedback 19 being dependent on the artificial intelligent agent 9;
controlling a submission 21 based on the content 17 composed 15 by the user 5; and causing the feedback 19 to be provided to the user 5.

As illustrated in FIG. 12, the computer program 77 may arrive at the apparatus 1 via any suitable delivery mechanism 79. The delivery mechanism 79 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 77. The delivery mechanism may be a signal configured to reliably transfer the computer program 77. The apparatus 1 may propagate or transmit the computer program 77 as a computer data signal.

Computer program instructions for causing an apparatus to perform at least the following or for performing at least the following:
obtaining a value of one or more parameters 3 which vary with actions 7 of a user 5;
accessing an artificial intelligent agent 9 configured to use one or more trained machine learning models $13_n$ selected, from a plurality of differently trained machine learning models $13_1$, $13_2$, based on the obtained value of one or more parameters 3, the plurality of differently trained machine learning models $13_1$, $13_2$ being configured to provide respective outputs;
providing content 17 composed 15 by the user 5 as an input to the artificial intelligent agent 9 to cause generation of feedback 19 to the user 5 on the content 17 composed 15 by the user 5, the feedback 19 being dependent on the artificial intelligent agent 9;

controlling a submission 21 based on the content 17 composed 15 by the user 5; and causing the feedback 19 to be provided to the user 5.

The computer program instructions may be comprised in a computer program, a non-transitory computer readable medium, a computer program product, a machine readable medium. In some but not necessarily all examples, the computer program instructions may be distributed over more than one computer program.

Although the memory 75 is illustrated as a single component/circuitry it may be implemented as one or more separate components/circuitry some or all of which may be integrated/removable and/or may provide permanent/semi-permanent/dynamic/cached storage.

Although the processor 73 is illustrated as a single component/circuitry it may be implemented as one or more separate components/circuitry some or all of which may be integrated/removable. The processor 73 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIG. 10 and the functions as described in relations to FIGS. 1 to 9 may represent steps in a method and/or sections of code in the computer program 77. The illustration of a particular order to the blocks does not necessarily imply that there is a required or preferred order for the blocks and the order and arrangement of the block may be varied. Furthermore, it may be possible for some blocks to be omitted.

The apparatus 1 of FIG. 1 and as described in relation to FIGS. 2 to 9 may be or may comprise the controller 71 of FIG. 11 or may be any computer or machine capable of reading the computer program 77 from the delivery mechanism 79 of FIG. 12 and running that computer program 77.

FIG. 13 schematically illustrates a device 81 comprising the controller 71 of FIG. 11.

The device 81 further comprises one or more sensors 83. The one or more sensors 83 are configured to monitor at least some actions 7 of the user 5.

The device 81 further comprises at least one user interface 85. The user 5 may compose 15 content 17 at the at least one user interface 85. Feedback 19 may be provided to the user 5 via the at least one user interface 85

The device 81 further comprises at least one transceiver 87. The at least one transceiver 87 may comprise any suitable means for receiving and/or transmitting information.

Information that is transmitted could comprise:

the obtained value(s) of the one or more parameters 3 (for example if the selection 11 is performed remotely and the plurality of the differently trained machine learning models $13_1$, $13_2$ are located remotely);

a signal identifying which one or more of the trained machine learning models $13_n$ are selected 11 from the plurality of the differently trained machine learning models $13_1$, $13_2$ (for example if the selection 11 is performed locally, at the device 81 and the plurality of the differently trained machine learning models $13_1$, $13_2$ are located remotely);

the content 17 composed 15 by the user 5;

the subject 29 which is addressed by the content 17 composed 15 by the user 5 or data based on the subject 29; or the submission 21 based on the content 17 composed 15 by the user 1.

The information that is transmitted may be transmitted with or without local storage of the data in the memory 75 at the device 81 and with or without local processing of the data by circuitry or processors 73 at the device 81.

Information that is received could comprise:

the first output of the artificial intelligent agent 9 (for example if the evaluator module(s) 33, 37 is located remotely and the selection 23 is performed locally, at the device 81);

a signal identifying which of the first or second processes 25, 27 for controlling a submission 21 based on the content 17 composed by the user 5 is selected 23 (for example if the evaluator module(s) 33, 37 is located remotely and the selection 23 is performed remotely); or the second output of the artificial intelligent agent 9 (for example if the plurality of the differently trained machine learning models $13_1$, $13_2$ are located remotely).

The at least one transceiver 87 may comprise one or more transmitters and/or receivers. The at least one transceiver 87 may enable a wireless connection between the device 81 and the Cloud, one or more remote devices or entities, or other parts of a distributed network. The wireless connection could via short-range radio communications such as Wi-Fi or Bluetooth, for example, or over long-range cellular radio links or any other suitable type connection.

In some examples the device 81 is an electronic device. The device 81 may be an electronic communications device such as a personal computer. The electronic device may be a portable electronic communications device such as a handheld electronic communications device or a wearable electronic communications device. The device 81 may be configured for mobile cellular communication. The device 81 may be a smartphone, a smartwatch, or another type of portable personal computer.

The apparatus 1 of FIG. 1 and as described in relation to FIGS. 2 to 9 may be or may comprise the device 81 of FIG. 13.

It is to be appreciated that the apparatus 1 may comprise any suitable means for performing the functions hereinbefore described.

Consequently, in some examples, the apparatus 1 comprises means for:
- obtaining a value of one or more parameters 3 which vary with actions 7 of a user 5;
- accessing an artificial intelligent agent 9 configured to use one or more trained machine learning models $13_n$ selected, from a plurality of differently trained machine learning models $13_1$, $13_2$, based on the obtained value of one or more parameters 3, the plurality of differently trained machine learning models $13_1$, $13_2$ being configured to provide respective outputs;
- providing content 17 composed 15 by the user 5 as an input to the artificial intelligent agent 9 to cause generation of feedback 19 to the user 5 on the content 17 composed 15 by the user 5, the feedback 19 being dependent on the artificial intelligent agent 9;
- controlling a submission 21 based on the content 17 composed 15 by the user 5; and
- causing the feedback 19 to be provided to the user 5.

As hereinbefore described, one or more functions or means for performing functions associated with the method of FIG. 10 can be performed or located remotely from the apparatus 1 or device 81 with which the user 5 directly interacts. Thus, it is to be appreciated that the method described in relation to FIG. 10 may be implemented by a system which may involve a distributed network of devices.

Consequently, in some examples there is provided a system comprising:
- means for obtaining a value of one or more parameters 3 which vary with actions 7 of a user 5;
- a plurality of differently trained machine learning models $13_1$, $13_2$, the plurality of differently trained machine learning models $13_1$, $13_2$ being configured to provide respective outputs;
- means for selecting 11 one or more trained machine learning models $13_n$ from the plurality of differently trained machine learning models $13_1$, $13_2$, based on the obtained value of one or more parameters 3;
- an artificial intelligent agent 9 configured to use the selected one or more trained machine learning models $13_n$;
- means for providing content 17 composed 15 by the user 5 as an input to the artificial intelligent agent 9 to cause generation of feedback 19 to the user 5 on the content 17 composed 15 by the user 5, the feedback 19 being dependent on the artificial intelligent agent 9;
- means for controlling a submission 21 based on the content 17 composed 15 by the user 5; and means for causing the feedback 19 to be provided to the user 5.

In some examples the system further comprises means for selecting 23 between a first process 25 for controlling a submission 21 based on the content 17 composed 15 by the user 5 and a second, different process 27 for controlling a submission 21 based on the content 17 composed 15 by the user 5. The selection 23 between the first process 25 and the second process 27 is dependent on the artificial intelligent agent 9. The second process 27 provides the feedback 19 before enabling a submission 21 based on the content 17 composed 15 by the user 5.

Where a structural feature has been described, it may be replaced by means for performing one or more of the functions of the structural feature whether that function or those functions are explicitly or implicitly described.

The systems, apparatus, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The algorithms hereinbefore described may be applied to achieve the following technical effects: improved control of content submission.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one memory including computer program code, the at least one memory and the computer program code configured to, with the at least one processor, cause the apparatus at least to perform:
   obtaining a value of one or more parameters which vary with actions of a user that are indicative of a mood of the user;
   accessing an artificial intelligent agent configured to use one or more trained machine learning models and selecting the one or more trained machine learning models, from a plurality of differently trained machine learning models, based on the obtained value of one or more parameters which vary with actions of the user that are indicative of the mood of the user, the plurality of differently trained machine learning models being configured to provide respective outputs;
   providing content composed by the user as an input to the artificial intelligent agent to cause: (i) a selection between a first process for controlling a submission based on the content composed by the user and a second, different process for controlling the submission based on the content composed by the user, and (ii) generation of feedback to the user on the content composed by the user, the feedback being dependent on the artificial intelligent agent, wherein the selection between the first process and the second process is dependent on the artificial intelligent agent;
   controlling the submission based on the content composed by the user; and
   causing the feedback to be provided to the user,
   wherein the second process provides the feedback before enabling the submission based on the content composed by the user,
   wherein the first process for controlling the submission based on the content composed by the user provides for automatic submission based on the content composed by the user, and
   wherein selecting the one or more trained machine learning models comprises selecting the one or more trained machine learning models that have been trained on previous content composed by the user in a different mood profile than a present mood profile of the user.

2. The apparatus as claimed in claim 1 wherein the at least one memory and the computer program code are configured to, with the at least one processor, cause the apparatus at least to further perform: provide another input, based on a subject that is addressed by the content composed by the user, to the artificial intelligent agent,
   wherein the selected one or more trained machine learning models are configured to generate content addressing the subject, wherein the content is generated to simulate content composed by the user or to simulate a response by the user to an input, and
   wherein the selection between the first process and the second process for controlling the submission based on the content composed by the user is dependent on a comparison, by the artificial intelligent agent, of the generated content with the content composed by the user.

3. The apparatus as claimed in claim 2 wherein the subject is obtained from further content which has been provided to the user, wherein the further content has been rendered to the user in a period of time or period of user interaction time directly preceding composition of the content by the user.

4. The apparatus as claimed in claim 2 wherein the subject is obtained by processing the content composed by the user.

5. The apparatus as claimed in claim 1 wherein the selected one or more trained machine learning models are configured to generate content addressing the content composed by the user, and
 wherein the selection between the first process and the second process for controlling the submission based on the content composed by the user is dependent on a sentiment classification, by the artificial intelligent agent, of the generated content.

6. The apparatus as claimed in claim 1 wherein the at least one memory and the computer program code are configured to, with the at least one processor, cause the apparatus at least to further perform: apply the selected one or more trained machine learning models to the content composed by the user.

7. The apparatus as claimed in claim 1 wherein the plurality of differently trained machine learning models are trained using training data comprising previous content composed by the user.

8. The apparatus as claimed in claim 7 wherein the at least one memory and the computer program code are configured to, with the at least one processor, cause the apparatus at least to further perform:
 classify the previous content composed by the user according to a value, obtained when the previous content was composed, of the one or more parameters which vary with actions of the user;
 form different sets of training data from differently classified previous content; and
 train respective different machine learning models on respective different sets of training data so as to provide the plurality of differently trained machine learning models.

9. The apparatus as claimed in claim 7 wherein the one or more parameters which vary with actions of the user comprise parameters which parameterize mood profiles of the user.

10. The apparatus as claimed in claim 7 wherein the one or more parameters which vary with actions of the user comprise one or more intended recipients of the content composed by the user, and
 wherein the selection of one or more trained machine learning models comprises selecting one or more trained machine learning models which have been trained on the previous content composed by the user for a similar one or more intended recipients.

11. The apparatus as claimed in claim 1 wherein providing the content composed by the user as the input to the artificial intelligent agent is responsive to a user input requesting a submission based on the content composed by the user.

12. The apparatus as claimed in claim 1 wherein the one or more trained machine learning models are comprised in one layer of the artificial intelligent agent, and wherein one or more other layers comprise one or more evaluative modules configured to evaluate one or more respective outputs of the selected one or more trained machine learning models.

13. The apparatus as claimed in claim 1 wherein the selected one or more trained machine learning models are trained to generate content as if composed by the user.

14. The apparatus as claimed in claim 1 wherein the submission is disabled until the content composed by the user has been changed by the user.

15. The apparatus as claimed in claim 14 wherein the submission is disabled until the feedback changes in response to the change to the content composed by the user.

16. The apparatus as claimed in claim 1 wherein the submission is disabled for a period of time following the provision of the feedback to the user.

17. A non-transitory computer readable medium comprising program instructions stored thereon for performing at least the following:
 obtaining a value of one or more parameters which vary with actions of a user that are indicative of a mood of the user;
 accessing an artificial intelligent agent configured to use one or more trained machine learning models and selecting the one or more trained machine learning models, from a plurality of differently trained machine learning models, based on the obtained value of one or more parameters which vary with actions of the user that are indicative of the mood of the user, the plurality of differently trained machine learning models being configured to provide respective outputs;
 providing content composed by the user as an input to the artificial intelligent agent to cause: (i) a selection between a first process for controlling a submission based on the content composed by the user and a second, different process for controlling the submission based on the content composed by the user, and (ii) generation of feedback to the user on the content composed by the user, the feedback being dependent on the artificial intelligent agent, wherein the selection between the first process and the second process is dependent on the artificial intelligent agent;
 controlling the submission based on the content composed by the user; and
 causing the feedback to be provided to the user,
 wherein the second process provides the feedback before enabling the submission based on the content composed by the user,
 wherein the first process for controlling the submission based on the content composed by the user provides for automatic submission based on the content composed by the user, and
 wherein selecting the one or more trained machine learning models comprises selecting the one or more trained machine learning models that have been trained on previous content composed by the user in a different mood profile than a present mood profile of the user.

18. The non-transitory computer readable medium as claimed in claim 17 wherein the program instructions are further configured to provide another input, based on a subject that is addressed by the content composed by the user, to the artificial intelligent agent,
 wherein the selected one or more trained machine learning models are configured to generate content addressing the subject, wherein the content is generated to simulate content composed by the user or to simulate a response by the user to an input, and
 wherein the selection between the first process and the second process for controlling the submission based on the content composed by the user is dependent on a comparison, by the artificial intelligent agent, of the generated content with the content composed by the user.

19. The non-transitory computer readable medium as claimed in claim 17 wherein the selected one or more trained machine learning models are configured to generate content addressing the content composed by the user, and
 wherein the selection between the first process and the second process for controlling the submission based on the content composed by the user is dependent on a sentiment classification, by the artificial intelligent agent, of the generated content.

20. A system comprising:
a plurality of differently trained machine learning models, the plurality of differently trained machine learning models being configured to provide respective outputs;
an artificial intelligent agent;
at least one processor; and
at least one memory including computer program code,
the at least one memory and the computer program code configured to, with the at least one processor, cause the system at least to perform:
obtaining a value of one or more parameters which vary with actions of a user that are indicative of a mood of the user;
selecting one or more trained machine learning models, from the plurality of differently trained machine learning models, based on the obtained value of one or more parameters which vary with actions of the user that are indicative of the mood of the user, wherein the artificial intelligent agent is configured to use the selected one or more trained machine learning models;
providing content composed by the user as an input to the artificial intelligent agent to cause: (i) a selection between a first process for controlling a submission based on the content composed by the user and a second, different process for controlling the submission based on the content composed by the user, and (ii) generation of feedback to the user on the content composed by the user, the feedback being dependent on the artificial intelligent agent, wherein the selection between the first process and the second process is dependent on the artificial intelligent agent;
controlling the submission based on the content composed by the user; and
causing the feedback to be provided to the user,
wherein the second process provides the feedback before enabling the submission based on the content composed by the user,
wherein the first process for controlling the submission based on the content composed by the user provides for automatic submission based on the content composed by the user, and
wherein selecting the one or more trained machine learning models comprises selecting the one or more trained machine learning models that have been trained on previous content composed by the user in a different mood profile than a present mood profile of the user.

* * * * *